Jan. 31, 1967  E. S. BABSON  3,301,381
CONVEYOR CONTROL APPARATUS
Filed July 31, 1964  3 Sheets-Sheet 1

Inventor
Edward S. Babson
By his Attorney
Robert E. Ross

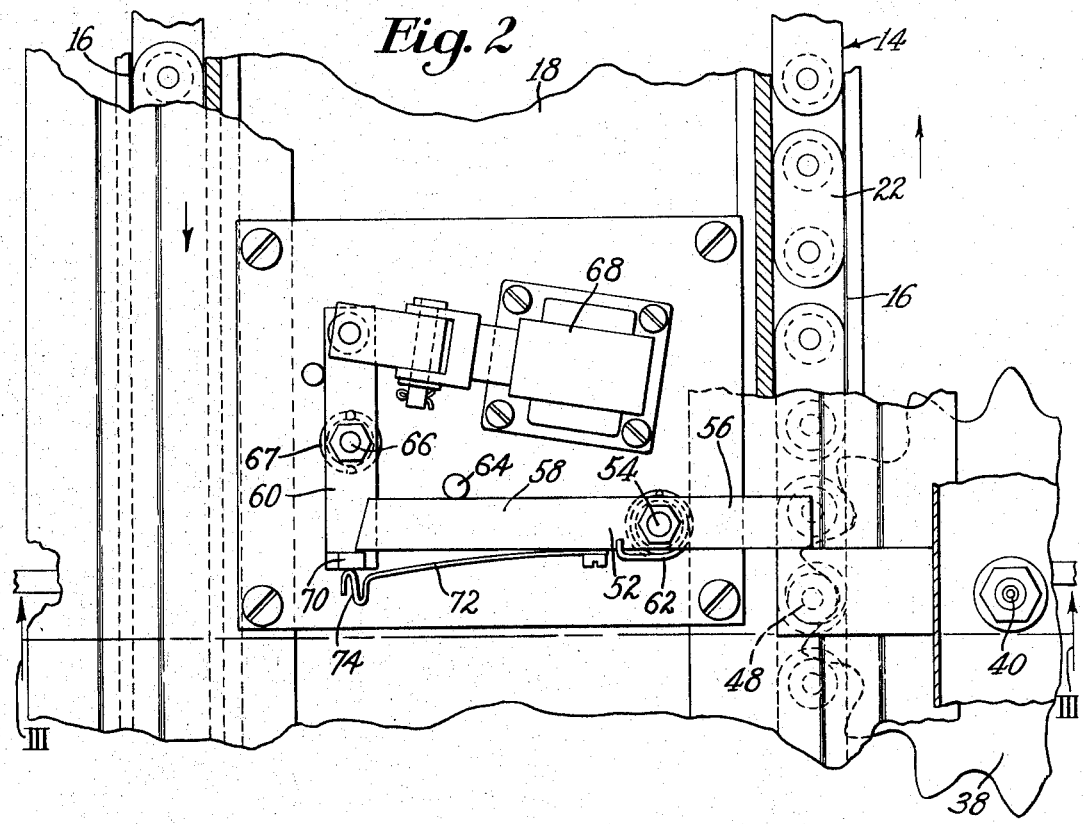
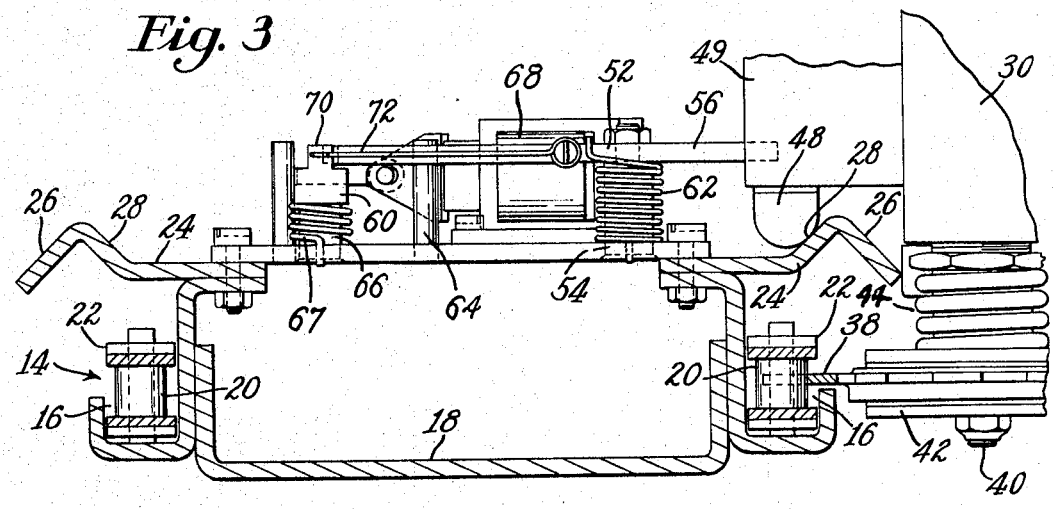

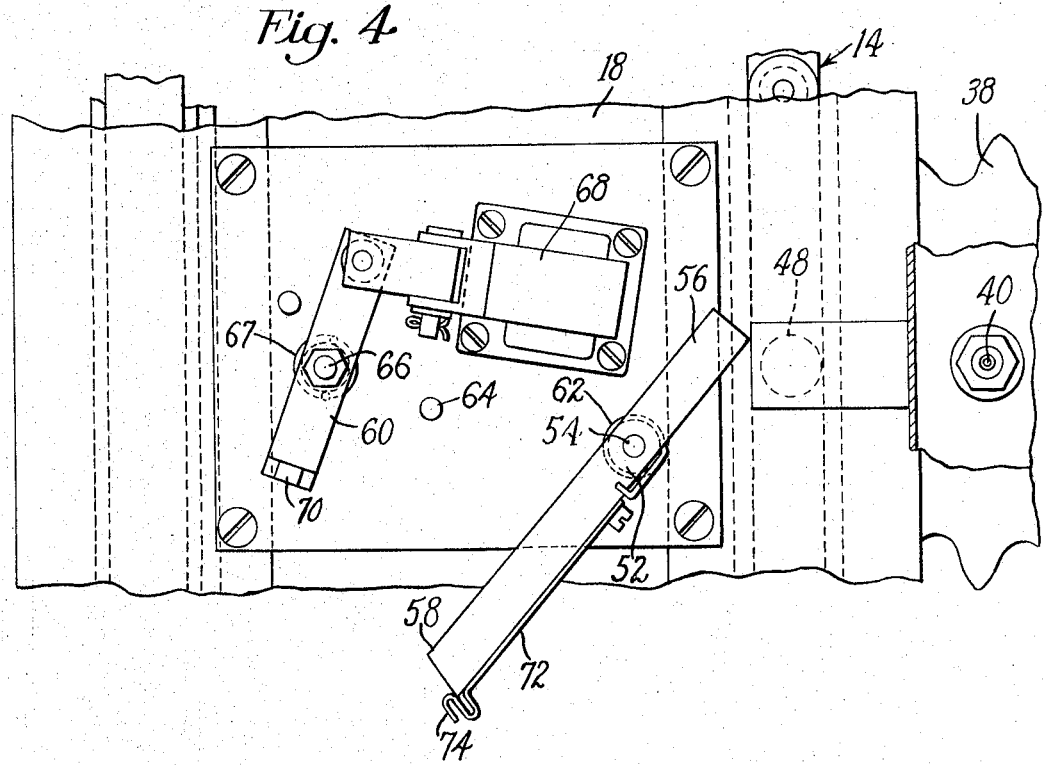
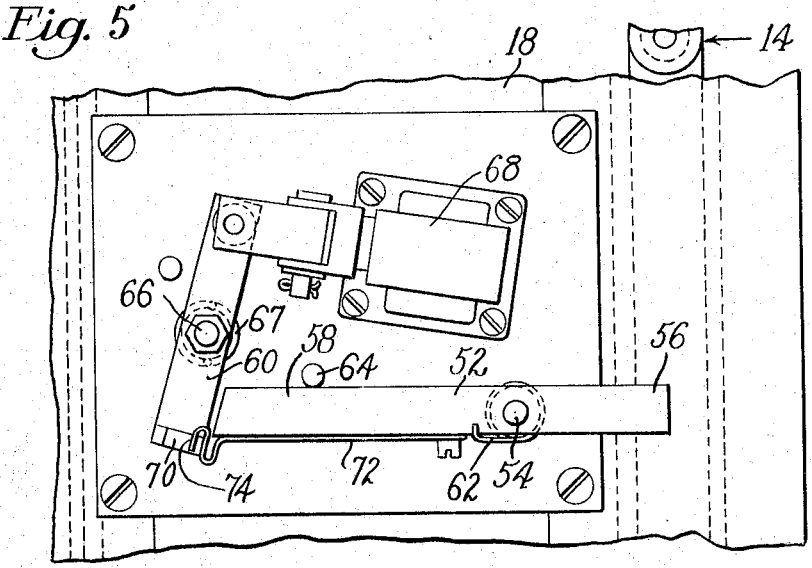

United States Patent Office 3,301,381
Patented Jan. 31, 1967

3,301,381
CONVEYOR CONTROL APPARATUS
Edward S. Babson, Ipswich, Mass., assignor to United Shoe Machinery Corporation, Flemington, N.J., a corporation of New Jersey
Filed July 31, 1964, Ser. No. 386,557
3 Claims. (Cl. 198—34)

This invention relates generally to conveyor systems of the type in which article carrying racks are moved between work stations by a conveyor or tow chain and has particular reference to a stop mechanism for controlling the movement of racks along the conveyor in response to a predetermined signal.

In a copending application Serial No. 371,204, filed May 29, 1964, there is disclosed a conveyor system of the above described type in which individual racks are provided with a friction loaded sprocket for engagement with the tow chain, said sprocket being adapted to remain in engagement with the chain when the rack is arrested by a stop mechanism. A continuous forward force is consequently applied to the stop mechanism by the rack.

When a plurality of racks are being used with the conveyor, as is normally the case, in many instances several racks may be waiting at a pool stop mechanism. Since the friction loaded sprocket of each waiting rack remains in engagement with the moving chain, the force applied to the stop member increases with each additional rack. If an excessive number of racks were to accumulate the stop member could be damaged or rendered inoperative.

An object of this invention is to provide control means for use with a conveyor system of the type described which limits the number of racks that can accumulate at a particular stop mechanism.

A further object of this invention is to provide control means for use with a conveyor system of the type described having stop means which automatically locks itself in the stop position after a rack has been released therefrom, with other means being provided responsive to the passage of the rack beyond a predetermined point to unlock the stop means.

Other objects of the invention will be apparent to one skilled in the art from the following detailed description of a specific embodiment thereof.

In the drawings:

FIG. 2 is a plan view of a stop mechanism used as a portion of the rack control system, said stop mechanism being locked in the stop position;

FIG. 3 is a view in section taken on line III—III of FIG. 2;

FIG. 4 is a view similar to FIG. 2 showing the stop mechanism released to permit a rack to pass; and FIG. 5 is a view similar to FIG. 4 showing the position of the stop mechanism after it has been unlocked in a manner to appear hereinafter.

Figure 1:
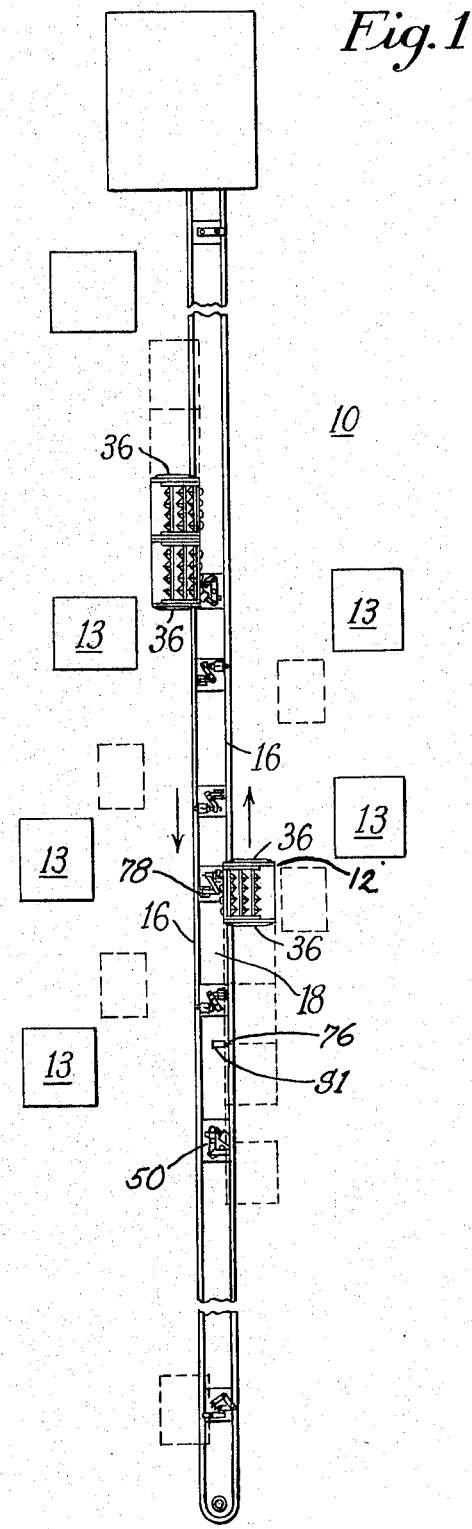
FIG. 1 is a schematic plan view of a conveyor system embodying the features of the invention.

Referring to the drawings there is illustrated a drag line conveyor system comprising a floor mounted conveyor 10 which is adapted to convey article carrying devices such as racks 12 between various work stations 13. In the illustrated embodiment the conveyor 10 comprises an endless tow chain 14 which travels in a pair of spaced guide channels 16 disposed on opposite sides of a center housing 18. During normal operation of the system the chain is driven continuously in one direction which in the illustrated embodiment is in the direction of the arrows in FIG. 1. The chain is of the type commonly known as roller chain and comprises a series of spaced vertical members 20 retained in position by upper and lower spacing plates 22. To provide means for retaining the rack in operative relation to the conveyor chain a cover 24 is disposed over each run of the chain, the outer edge of each of said covers having a downwardly sloping cam surface 26 leading to a shoulder portion 28 for a purpose to appear hereinafter.

The rack 12 comprises a base 30 having casters (not shown) mounted thereon to enable the rack to be moved freely in any direction. The rack may be provided with any convenient means for supporting the articles to be carried thereby. Disposed at each end of the rack is a spring bumper 36 to permit collision between adjoining racks without damage to the articles being carried.

To provide means for engagement with the conveyor chain, a drive sprocket 38 is mounted below the rack base on a suitable shaft 40. In the illustrated embodiment the drive sprocket is disposed between a pair of friction disks 42, said disks being non-rotatably disposed on the shaft 40 and being urged against the drive sprocket by means of a spring 44.

To provide means for releasably maintaining the rack in the proper position in relation to the chain 14 so that the sprocket 38 is engaged with the chain, a spring loaded detent 48 is disposed on the side of the rack adjacent the chain in a suitable housing 49. The detent is positioned at an elevation such that when the rack is moved into operative relation to the conveyor by being pushed sideways toward the tow chain, the detent 48 cams itself up the surface 26 and snaps over the shoulder portion 28 of the chain cover 24.

During normal operation of the conveyor a rack to be transported thereby may be pushed against the conveyor in the manner described so that the sprocket 38 engages the continuously moving chain and is retained in operative relation thereto by the detent 48. Since the rack at this instant is stationary the drive sprocket will rotate momentarily at a rate corresponding to the chain speed, and as the force applied thereto by the chain accelerates the rack in the direction of chain motion, the rate of rotation of the sprocket will decrease substantially to zero. When the rack being conveyed reaches a stop mechanism, or collides with a previous rack or with some other obstruction, causing the rack to stop, the drive sprocket, which remains in engagement with the chain, commences to rotate at a speed corresponding to the chain speed. When the stop mechanism is released or the obstruction is removed the rack will again accelerate to the speed of the chain, with the sprocket rotation decreasing substantially to zero as the rack accelerates.

At various positions along the conveyor it is desirable to form rack pooling stations, from which racks may be released one at a time by operators at downstream work stations. For the reason previously described, it is desirable to limit the number of racks that can be accumulated behind any one pool stop.

For this purpose a control stop mechanism 50 may be disposed at appropriate positions along the conveyor upstream from each pool stop with associated control means to be described, so that no more than a predetermined number of racks can be accumulated at any one pool stop.

Each control stop mechanism 50 comprises a stop arm 52 pivoted on a shaft 54 and having a first end 56 projecting into the path of racks traveling on the conveyor and a second end 58 adapted for latching engagement with a latch arm 60 as will be described hereinafter. The arm 52 is biased in a clockwise direction (as seen in FIG. 2) by means of a spring 62 so that the end 58 of the arm normally rests against a stop pin 64. The arm 60, pivoted on a shaft 66 is normally biased in the latching position by a spring 67 and is movable to the non-latching position by energization of a solenoid 68. An upwardly projecting latch portion 70 is provided in the latch arm 60 which is adapted to retain the end 58 of the arm 52 to prevent counterclockwise movement thereof when the mechanism is in the stop position.

To prevent latching of the end 58 behind the latch portion 70 under certain circumstances to be described (see FIG. 5) a spring arm 72 is attached to the end 58, the distal end of said arm having a transversely extending portion 74 which is positioned to render the latch arm inoperative under certain conditions by preventing the latch portion 70 from passing in front of the end 58 of the arm 52.

The energization of the solenoid 68 is controlled by a normally open switch 51, said switch being closed momentarily when the detent housing 49 of a rack traveling on the conveyor strikes a switch operating plunger 76.

The operating plunger 76 of switch 51 is disposed a predetermined distance upstream from the pool stop mechanism 78, so that the first three racks released from the pool stop 50 will actuate the plunger 76, as they move along the conveyor, but the fourth rack will be stopped by the third rack before the detent housing 49 of the fourth rack reaches the operating plunger 76, for a purpose now to be described.

Assuming that four racks are waiting at the downstream pool stop mechanism 78 and the stop arm 52 of the control stop 50 is latched in the stop position, the next rack arriving at the control stop will be arrested by the end 56 of the stop arm 52 projecting into the path of the detent housing 49 of the rack (see FIG. 2).

When a rack is released from the pool stop 78 the remaining racks will all move forwardly so that the detent housing of the fourth rack passes the switch operating plunger 76, momentarily closing the circuit to the solenoid 64. The resulting momentary energization of the solenoid pivots the latch arm 60 in a clockwise direction releasing the end 58 of the stop arm 52 so that the rack being retained by said stop arm can move forwardly (see FIG. 1). The latch arm 60 is immediately returned to its original position by the spring 67 and as the detent housing 49 of the released rack clears the end 56 of the stop arm, said arm swings in a clockwise direction back to its original position so that the end 58 thereof snaps behind the latch portion 70 of the latch arm 60 as shown in FIG. 2. The next rack arriving at the stop arm will therefore be arrested in the manner previously described.

It is apparent that a rack waiting at the stop arm 52 will be released when a rack is released from the downstream pool stop only if there are four racks waiting at said pool stop so that the fourth rack can actuate the switch S1. Hence, if several racks are removed in rapid succession from the downstream pool stop, so that there is room for more than one additional rack behind the pool stop mechanism, it is necessary that the stop arm 52 be left in the unlocked condition so that the next rack arriving at the stop mechanism will be allowed to pass without being arrested. This is accomplished in the following manner: Assuming that two racks of the original four are removed from the down-stream stop mechanism, the fourth rack, in moving forwardly, will actuate the switch 51 to unlock the stop arm 50 in the manner previously described. However, since there are now only two racks remaining behind the pool stop, the rack released from the stop mechanism 50 will also pass the operating plunger 76 and thereby close switch 51. At the time said released rack reaches the plunger 76 the stop arm has returned to the latched position illustrated in FIG. 2. The subsequent momentary energization of the solenoid by the released rack will move the latch arm clockwise to move the latch portion 20 away from the stop arm, however, on de-energization of the solenoid the latch arm is prevented from moving back into the latching position by the transversely extending portion 74 of the spring arm 72 (see FIG. 5).

The stop arm 52 is thereby left in the unlatched condition so that the next rack to arrive at the stop arm can pass without stopping. As said next rack passes the stop arm, said arm is pivoted by the detent housing in the manner previously described and swings back so that the end 58 again latches behind the latch portion 70.

Hence, each rack passing through the control stop mechanism latches the stop mechanism behind itself and then unlatches the stop mechanism if there is sufficient space behind the pool stop to receive another rack.

Since certain obvious changes may be made in the above described conveyor system and the control means therefor, it is intended that all matters contained herein be interpreted in an illustrative and not a limiting sense.

Having thus described my invention, what I claim as new and desire to secure by Letters Patent of the United States is:

1. A conveyor control system for use with a conveyor system in which article-carrying devices are engaged with a conveyor so as to be continuously urged forward even when being held stationary at a stop member, said control system being adapted to limit to a predetermined number the article carrying devices that can be retained by a pool stop, and comprising a control stop member disposed upstream from the pool stop member, control stop release means disposed between the pool stop and the control stop, said release means being actuated by the passage of an article carrying device, said control stop being automatically urged to the locked position by the movement of a released article carrying device thereby, means mounted on the stop mechanism for engagement with the locking means preventing locking when there are less than the predetermined number of articles at the pool stop, said control stop release means being positioned a predetermined distance upstream from the pool stop so that each article carrying device released from the control stop actuates said control stop release means except when the number of article-carrying devices already waiting at the pool stop equals one less than said predetermined number.

2. A conveyor control system to be used in conjunction with a continually moving conveyor from which articles engaged therewith receive continual forward impetus, said system comprising pooling means adjacent said conveyor for stopping and holding a predetermined number of articles in a pooling position readily available for work stations downstream therefrom, switching means adjacent said conveyor upstream of the pooling means, said switching means being positioned for operation by articles transported by said conveyor to actuate a latching control stop mechanism adjacent the conveyor upstream of said switching means, actuation and subsequent unlatching of said control stop mechanism occurring when less than a predetermined number of articles are restrained by said pooling means, thus allowing further articles to enter the pooling position, control means linked to said pooling means automatically restraining the articles only when an article is not needed at a downstream work station, actuating means linked to said control stop mechanism responsive to the downstream switching means to actuate said control stop mechanism permitting passage of articles only when less than the predetermined number of said articles are in the pooling position, means mounted on said control stop mechanism for engagement with a separate latch means preventing latching of the stop mechanism in the stop position when less than the predetermined number of articles are in the pooling position.

3. A conveyor control system for use with a conveyor system in which articles are engaged with a conveyor so as to be continuously urged forwardly even when being held stationary at a stop member, said control system serving to limit to a predetermined number the articles that can be retained by a pool stop, and comprising a control stop mechanism disposed upstream from the pool stop adjacent the conveyor, said control stop mechanism having a latched position in which said devices are arrested at the control stop overriding the forward impetus, means disposed between the pool stop and the control stop mechanism for unlatching the control stop mechanism, means urging said control stop mechanism to return automatically to the latched position after an article is released therefrom, means mounted on the control stop mechanism for engagement with the latch means for preventing latching when there are less than the predetermined number of articles at the pool stop, said unlatching means being actuated by the passage of a released article a predetermined distance beyond said control stop.

References Cited by the Examiner
UNITED STATES PATENTS

| | | | |
|---|---|---|---|
| 1,914,779 | 6/1933 | Libby | 198—21 |
| 2,801,725 | 8/1957 | Sindzinski et al. | 198—19 |

SAMUEL F. COLEMAN, *Primary Examiner.*

EVON C. BLUNK, *Examiner.*

R. J. HICKEY, *Assistant Examiner.*